(12) United States Patent
McLaughlin et al.

(10) Patent No.: US 11,481,282 B2
(45) Date of Patent: Oct. 25, 2022

(54) REDUNDANT CONTROLLERS OR INPUT-OUTPUT GATEWAYS WITHOUT DEDICATED HARDWARE

(71) Applicant: Honeywell International Inc., Morris Plains, NJ (US)

(72) Inventors: Paul Francis McLaughlin, Ambler, PA (US); Jason Thomas Urso, Houston, TX (US); James Michael Schreder, Perkasie, PA (US); John Rosa-Bian, Ambler, PA (US); Norman Swanson, Douglassville, PA (US); Jethro F. Steinman, Haverford, PA (US)

(73) Assignee: Honeywell International Inc., Morris Plains, NJ (US)

( * ) Notice: Subject to any disclaimer, the term of this patent is extended or adjusted under 35 U.S.C. 154(b) by 601 days.

(21) Appl. No.: 16/502,692

(22) Filed: Jul. 3, 2019

(65) Prior Publication Data

US 2020/0310920 A1 Oct. 1, 2020

Related U.S. Application Data

(60) Provisional application No. 62/825,884, filed on Mar. 29, 2019.

(51) Int. Cl.
*G06F 11/00* (2006.01)
*G06F 11/14* (2006.01)
(Continued)

(52) U.S. Cl.
CPC ...... *G06F 11/1456* (2013.01); *G05B 19/4184* (2013.01); *G05B 19/4185* (2013.01);
(Continued)

(58) Field of Classification Search
CPC ............. G06F 11/1456; G06F 11/1423; G06F 11/1458; G06F 11/0736; G06F 11/1658;
(Continued)

(56) References Cited

U.S. PATENT DOCUMENTS

| 4,958,270 A | 9/1990 | McLaughlin et al. |
| 5,088,021 A | 2/1992 | McLaughlin et al. |

(Continued)

FOREIGN PATENT DOCUMENTS

| EP | 0416891 A2 | 3/1991 |
| WO | 94/23367 A1 | 10/1994 |
| WO | 2015/169352 A1 | 11/2015 |

OTHER PUBLICATIONS

European Examination Report dated Feb. 11, 2022, issued in connection with corresponding EP Application No. 20165415.9 (10 pages total).

*Primary Examiner* — Joseph D Manoskey
(74) *Attorney, Agent, or Firm* — John Maldjian; Stevens & Lee PC (57) ABSTRACT

A method of fault-tolerant process control includes providing a network process control system in an industrial processing facility (IPF) including a plant-wide network coupling a server to computing platforms each including computing hardware and memory hosting a software application for simultaneously supporting a process controller and another process controller or an I/O gateway. The computing platforms are coupled together by a private path redundancy network for providing a hardware resource pool. At least some of the computing platforms are directly coupled by an I/O mesh network to a plurality of I/O devices to field devices that are coupled to processing equipment. Upon detecting at least one failing device in the hardware resource pool, over the private path redundancy network a backup is placed into service for the failing device from the (Continued)

another process controller or I/O gateway that is at another of the computing platforms in the hardware resource pool.

18 Claims, 6 Drawing Sheets

(51) Int. Cl.
  *G05B 19/418* (2006.01)
  *G06F 9/50* (2006.01)
  *G06F 13/42* (2006.01)
(52) U.S. Cl.
  CPC ........ *G06F 9/5011* (2013.01); *G06F 11/1423* (2013.01); *G06F 11/1458* (2013.01); *G06F 13/4221* (2013.01); *G06F 2209/5011* (2013.01)
(58) Field of Classification Search
  CPC ............. G06F 11/2005; G06F 11/2002; G06F 11/2007; G06F 9/5011; G06F 13/4221; G06F 2209/5011; G05B 19/4184; G05B 19/4185

See application file for complete search history.

(56) References Cited

U.S. PATENT DOCUMENTS

| | | | |
|---|---|---|---|
| 6,170,044 | B1 | 1/2001 | McLaughlin et al. |
| 6,272,386 | B1 | 8/2001 | McLaughlin et al. |
| 9,990,286 | B1 | 6/2018 | McLaughlin et al. |
| 2011/0258433 | A1* | 10/2011 | Pulini ................. H04L 63/20 713/153 |
| 2012/0117416 | A1 | 5/2012 | Mclaughlin et al. |
| 2017/0199515 | A1* | 7/2017 | Bhat ..................... G05B 9/03 |
| 2018/0364673 | A1* | 12/2018 | Van Wensen ........... G05B 9/03 |
| 2019/0050342 | A1* | 2/2019 | Drayton ............. G06F 12/1009 |
| 2020/0103861 | A1* | 4/2020 | Flood ................ G05B 23/0297 |
| 2021/0152495 | A1* | 5/2021 | Craig .................. H04L 49/552 |

* cited by examiner

REDUNDANT CONTROLLERS OR INPUT-OUTPUT GATEWAYS WITHOUT DEDICATED HARDWARE

CROSS REFERENCE TO RELATED APPLICATIONS

This application claims the benefit of Provisional Application Ser. No. 62/825,884 entitled "REDUNDANT CONTROLLERS OR DATA ACQUISITION DEVICES WITHOUT DEDICATED HARDWARE", filed Mar. 29, 2019, which is herein incorporated by reference in its entirety.

FIELD

Disclosed embodiments relate to network control systems, more particularly to redundant controllers or redundant input/output (I/O) gateway devices in network control systems.

BACKGROUND

The failure of an industrial control system can lead to costly downtime. There is expense involved in restarting a process along with the actual production losses resulting from such a failure. If the process is designed to operate without supervisory or service personnel, all of the components in the process control system generally need to be fault-tolerant.

A fault-tolerant industrial process control system may employ a 1:1 redundancy system to synchronize the central processing unit (CPU) data in memory, where a memory is maintained in an identical fashion in both a primary memory associated with a primary process controller and a secondary memory associated with a dedicated secondary process controller using an initial memory transfer followed by updates that are tracked changes to the primary memory image. As known in the art, a memory cache (cache) is a high-speed buffer for use with a lower-speed random access memory (RAM). CPU's without a cache express all changes to the RAM bus where they are captured (data and address). CPU's with write-through caching act in a similar manner. In contrast, CPUs with a cache commonly used for process control systems that need to react to process changes rapidly may not support write-thru caching.

Figure 1:
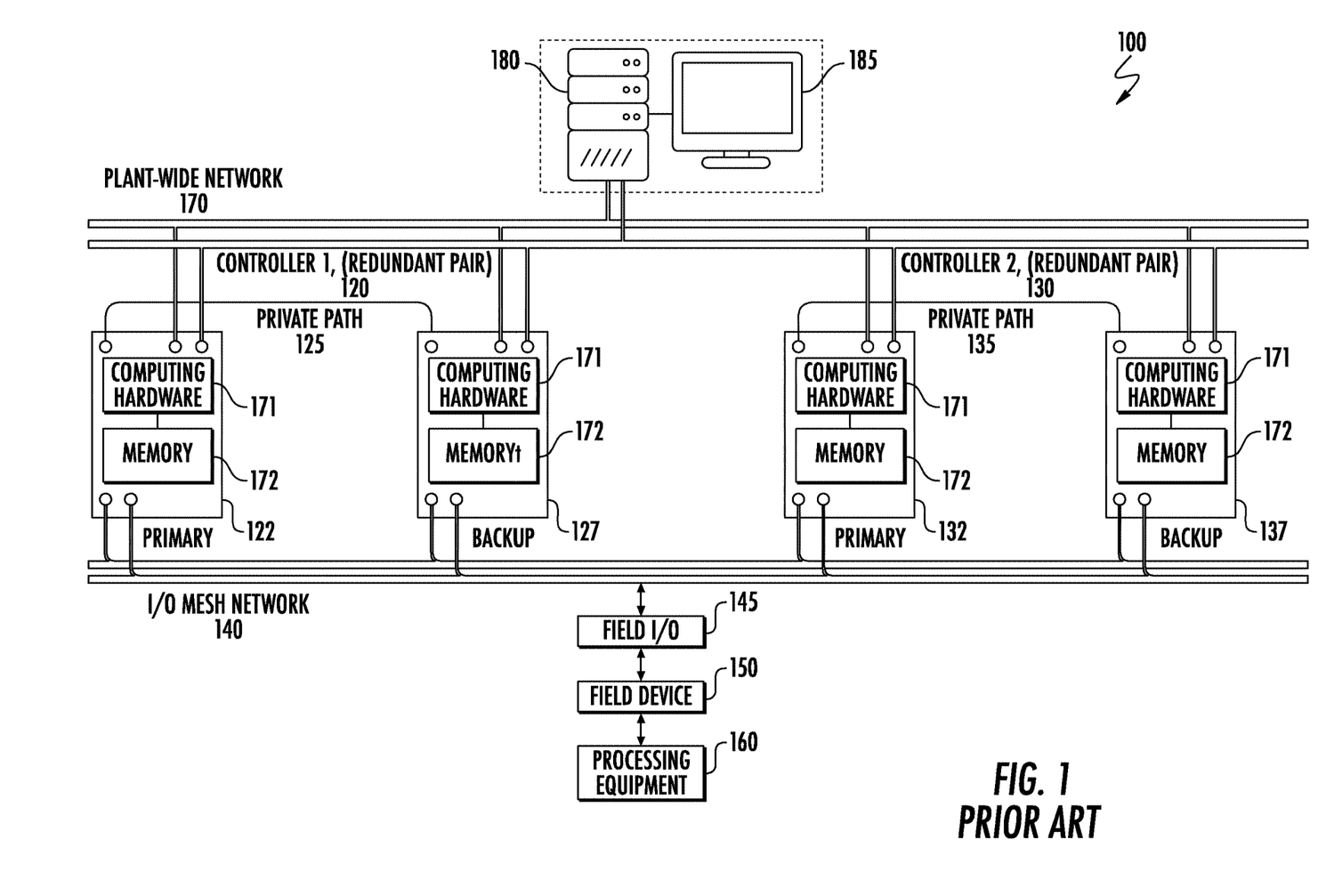
FIG. 1 depicts a conventional industrial control system including a redundant process controller arrangement each including a primary controller and a dedicated redundant controller both coupled to field I/Os and field devices to control processing equipment.

Traditional high availability control system redundancy uses a primary controller with a 1:1 backup controller. FIG. 1 depicts a conventional industrial control system 100 including a redundant process controller arrangement shown as redundant controller platform 1 120 and redundant controller platform 2 130 each having a pair of process controllers that each include computing hardware 171 that comprises at least one processor and associated memory 172. In redundant controller platform 1 120 there is a primary controller 122 and a dedicated backup (redundant) secondary controller 127, and similarly in redundant controller platform to 130 there is a primary controller 132 and a secondary controller 137. The redundant process controllers 1 and 2 120, 130 are both shown coupled by an input/output (I/O) mesh network 140 to control processing equipment 160 shown coupled through field I/O devices 145 and field devices 150. There are shown private-path networks 125 and 135 dedicated for data transfer for the synchronization of the controllers in each redundant controller pair. There is also shown a plant-wide network 170 (such as Ethernet cable-based) between the controllers 120 and 130 and server(s) 180 and at least one Human-Machine Interface (HMI) 185.

Traditional embedded controller redundancy as shown in the conventional industrial control system 100 in FIG. 1 increases controller availability by deploying controllers in whatever configuration is needed, with one controller as the primary controller, and the other as a backup controller that is ready to assume process control in the event of a failure of the primary controller. The two redundant controller pairs 120 and 130 depicted in FIG. 1 thus require a total of four controllers each including dedicated computing hardware 171.

An I/O gateway device such as a remote terminal unit (RTU), or edge gateway may also be configured with device redundancy. A RTU is a microprocessor-controlled electronic device that interfaces devices or apparatus in the physical world to a distributed control system or supervisory control and data acquisition (SCADA) system. An edge gateway is a virtual router for organization Virtual Device Contexts (VDC) networks which can be configured to provide network services such as Dynamic Host Configuration Protocol (DHCP), firewall, Network Address Translation (NAT), static routing, virtual private network (VPN), and load balancing. Technically an I/O device is not the same as an RTU although an RTU can include I/O devices as part of the assembly and thus can be used as an I/O device. I/O devices are usually simpler as compared to RTU's and do not have the telemetry feature for long-distance, independent data acquisition transmission.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize a significant problem for industrial control systems that include a redundant process controller arrangement such as the conventional industrial control system 100 shown in FIG. 1 is that traditional redundant controllers each require a dedicated backup controller, wherein in the case of redundant process controllers the backup controller is only used when the primary controller fails. Also, if both the primary process controller and backup process controller fail, the process control mission is no longer possible which is generally referred to as being 'lost'.

Disclosed M:N redundancy schemes for computing platforms allow for more flexibility in that in the case of controllers any active process controller in the control system can also serve as a backup controller for another controller while continuing its own process control mission to take over the process control mission of a failing primary controller, so that no explicit dedicated backup controller hardware including computing hardware is required to implement a disclosed computing platform redundancy scheme. Accordingly, in the case of controllers, even if there are multiple controller faults, the primary control missions can still be maintained by workload shedding to available controller hardware. As used herein, again in the case of controllers, M is number of primary controller instances/environments, and N is number of additional controller platforms necessary to provide redundancy for M.

Figure 6:
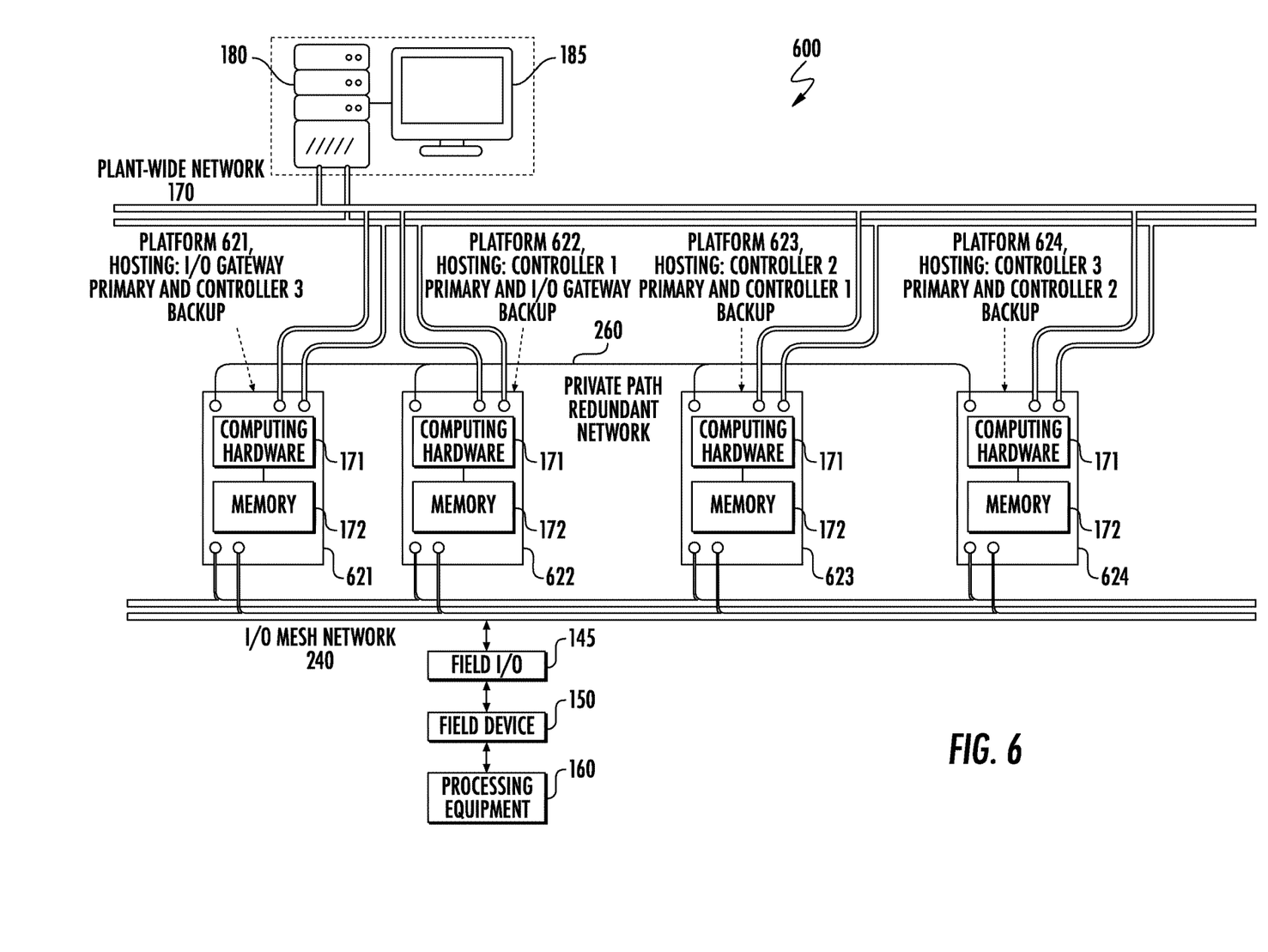
FIG. 6 depicts an example disclosed network control system implementing disclosed I/O gateway hardware and redundant controllers shown as 4 computing platforms, that collectively implement one redundant I/O gateway device and three redundant controllers 1, 2 and 3.

Although generally described herein for process controllers, disclosed hardware redundancy schemes may also be applied to I/O gateways, such as shown in FIG. 6 described below. The process controller or I/O gateway can be an embedded device or a virtual device that can host applications performing functions including analog, digital or sequential control functions, I/O gateway, supervisory control, advanced control applications, and user written programs.

One disclosed embodiment comprises a method of fault-tolerant process control comprising configuring a network process control system in an industrial processing facility (IPF) comprising a plurality of computing platforms coupled by a plurality of I/O devices to field devices in a field level that are coupled to process equipment. The plurality of I/Os are configured to enable coupling any of the I/Os to any one of the process controllers, thus not being slaved as always being configured in a conventional hierarchical fashion.

A failure is detected for a first of the plurality of process controllers or a first of the I/O gateways, which can use known ways for detecting a device failure. These known device failure detection techniques include by detecting a network failure, a diagnostic failure, a loss of an I/O path, or a watch dog timeout. One of the process controllers or I/O gateways at another computing platform while in service in its own mission and also in service as a redundant backup device for another device, is placed into service in a restoration step to also function as a redundant controller or redundant I/O gateway for the first process controller or first I/O gateway to control or receive data from associated field devices with the first process controller or the first I/O gateway. The redundant controller or redundant I/O gateway continues to operate as a primary controller for its associated field devices or primary I/O gateway for its associated field devices. The restoration step may be implemented by a user interaction, or fully automatically by using software that organizes/orchestrates the primary-backup relationships and adjusts the relationships as needed.

An enabling aspect for disclosed embodiments is an I/O mesh network. An I/O mesh is an I/O configuration where instead of I/O's being bound via a physical, dedicated link to one specific process controller, the I/O's are instead meshed at the channel level to all controllers and I/O gateways in a group of controllers and I/O gateways, so that any one process controller in the group of controllers or I/O gateways and a group of I/O gateways can have a flexible workload assignment to be able to act on inputs and outputs in the I/O mesh. The I/O mesh enables the flexible redundancy scheme. In brief, an I/O mesh network is a shared I/O network where multiple controllers and optional I/O gateways, and multiple I/O modules and devices reside on the same network, such that the I/O resources can be shared amongst the process controllers and I/O gateways.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an IPF runs an industrial process involving a tangible material that disclosed embodiments apply. For example, oil and gas, chemical, beverage, pharmaceutical, pulp and paper manufacturing, petroleum processes, electrical, and water. An IPF is distinct from a data processing system that only performs data manipulations.

This Disclosure eliminates the need for dedicated secondary hardware for a back-up controller or a dedicated back-up I/O gateway (e.g., a RTU or edge gateway hardware). This Disclosure also allows for greater backup coverage. A disclosed concept is to create at least one group of primary process controllers or a group of I/O gateway devices that in addition to running their primary process control or I/O gateway device mission (e.g., controller controlling field devices such as actuators and I/O gateway device reading data from sensing devices), are configured to also act as backups for other primary controllers or other I/O gateway devices simultaneously. Thus, there is the ability to run 2 or more simultaneous primary control or primary I/O gateway device missions should one or more of the other primary controller or I/O gateway hardware nodes fail.

Figure 2:
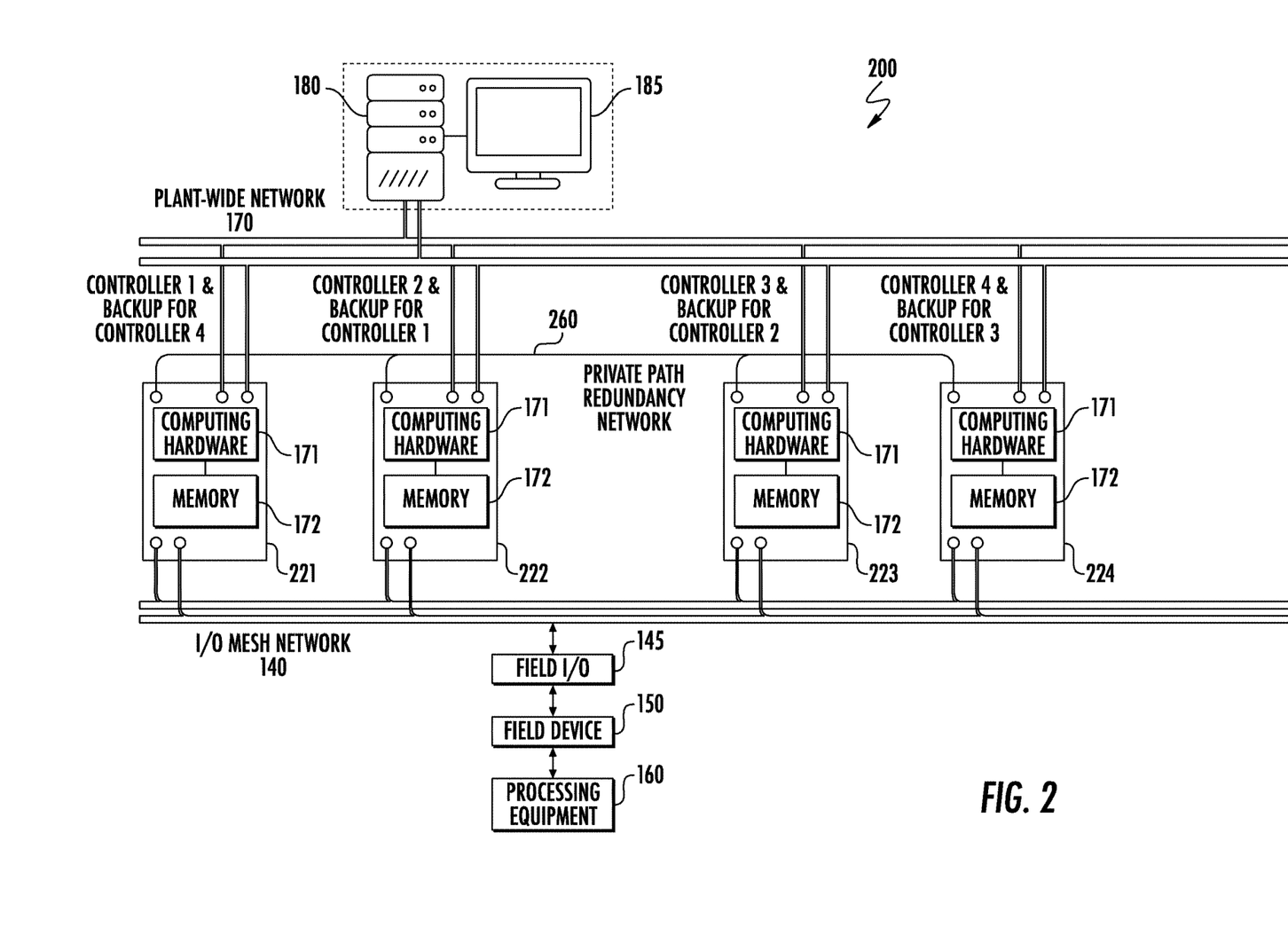
FIG. 2 depicts an example disclosed network control system implementing disclosed redundant controllers without any dedicated secondary (redundant) hardware coupled to field I/Os and field devices to control processing equipment.

FIG. 2 depicts an example network control system 200 implementing disclosed redundant controllers without any secondary hardware. There are only primary controllers shown as controller 1 221, controller 2 222, controller 3 223, and controller 4 224, because there is no need for any secondary controller as each primary controller 221, 222, 223, 224 can when needed function as a backup controller for another primary controller. As shown only by example, controller 1 221 functions as a backup controller for controller 4 224, controller 2 222 functions as a backup controller for controller 1 221, controller 3 223 functions as a backup controller for controller 2 22, and controller 4 224 functions as a backup controller for controller 3 223. In FIG. 2, each primary node having a primary controller 221-224 is thus also functioning as a backup controller for another controller.

Each controller 221, 222, 223, and 224 includes computing hardware 171 and associated memory 172. The memory is for hosting at least one software application, here control software for a controller. In the case of an I/O gateway, the software application will be for communications for an I/O gateway.

There is a private path redundancy network 260 that is shown providing a hardware resource pool by connecting all the controllers together that enables any one of the plurality of process controllers while in service in its own mission to be placed into service in a restoration step for a failed controller to also function as a redundant controller to control the associated field devices. The private path redundancy network 260 is a high-speed network to enable the computing platforms to stay in step with one another. As noted above, the controller functioning as the redundant controller continues to operate as a primary controller for its associated field devices, and the restoration step may be implemented by a user interaction or automatically by using a software component that organizes/orchestrates the primary-backup relationships and adjusts the relationships as needed.

In another arrangement any of the process controllers connected into a group by the private path redundancy network 260 may back 2 or more controllers. This arrangement shown in FIG. 2 or related disclosed arrangements, also allows for hot spare hardware devices to be allocated in the controller group, where the spare controller is not currently running a primary control mission unless/until a primary controller fails in which case its control workload is transferred (or shed) to the spare controller. Spares are not required but can be added on a customer basis if they desire additional availability. Should a controller or I/O gateway node fail, the controller or I/O gateway device that is backing up the failed controller or I/O gateway device node then runs both its own and the other nodes process control or I/O gateway mission. Then, another node will back up this device for the control or I/O gateway mission that it has just taken on, so that both of its primary control or primary I/O gateway missions are backed up by controller or I/O gateway devices at other nodes.

Regarding implementation, there are a wide variety of possible design approaches with some examples provided in terms of implementation of redundant process controllers. For example, four options are listed below:

1. The creation of a software-based layer of abstraction (or software container) which encapsulates the controller function, where the rest of the system, including the configuration tools and HMI 185 view each controller as an "application module" (or AM), which is hosted by, but not bound to, a controller hardware platform including computing hardware 171, or address.

2. In conjunction with the design for option #1, the creation of a low-level software/firmware layer in the controller platform, which allows it to host multiple AM's (or software containers) simultaneously, and considers the physical resource profile (including memory, central processing unit (CPU), etc.) of each AM.

3. The use of a private-path network (for redundancy and synchronization data traffic) which connects all controller platforms in a group.

4. A design which ensures that redundancy state information for each AM is treated as an attribute of the AM, and not the host platform.

The arrangement shown in FIG. 2 delivers a comparable availability profile to traditional controller redundancy, but eliminates the need for dedicated hardware for any dedicated backup controllers as shown in FIG. 1 described above. In normal operation, each controller in FIG. 2 serves as both an active controller and a backup controller for another controller. Upon the detection of a failure of any controller, its partner (backup) controller assumes a role of a dual primary. In one deployment, the overall number of controllers deployed is half of the baseline case shown in FIG. 1 described above. In the FIG. 2, four controllers are deployed (same as in FIG. 1), but with disclosed enhancements such that each controller is capable of acting as both a primary controller and a backup controller simultaneously, or as a dual primary controller in the event of another controller. Thus, with the same amount of controller hardware, the user can configure four redundant controllers, rather than two controllers in the conventional arrangement shown in FIG. 1 described above.

This disclosed concept generally depends on having an IO mesh network 140, so that IO's are not conventionally slaved in a hierarchical fashion to any one specific node. As described above, an I/O mesh is relatively new concept where instead of I/Os being bound via a physical, dedicated link to one specific process controller, it is meshed at the channel level to all controllers in the I/O group so any one process controller can act on inputs and outputs in the I/O mesh. I/O mesh enables the flexible redundancy scheme.

This disclosed form of controller/node redundancy represents cost savings (no unused hardware), simpler deployment options, and higher availability (multiple backup capability available, not just a specific node). This disclosed design leverages today's 1:1 redundancy methodology for the core redundancy behaviors of initial synch, synch maintenance, and failover handling. Initial synchronization can be done once a viable backup is ascertained from the pool of primary nodes, and trickle synchronization which is disclosed in U.S. Pat. No. 6,170,044 entitled "Systems and Methods for Synchronizing Redundant Controllers with Minimal Control Disruption" can be used to transfer the complete database in an atomic fashion while running the control mission, so there is no interruption or delay to the primary controls. Synch maintenance occurs as in standard 1:1 redundancy, and failover method works in a similar manner to 1:1, where the node backing up a primary controller continually checks the health of its partner and initiates failover/I/O handling/control execution from the last cleanpoint synchronized data.

The new characteristics disclosed herein are the simultaneous execution of primary control, the ability to backup one or more other primary controllers, and the ability to run two simultaneous control missions independent of each other and with the proper control performance. Disclosed embodiments can be applied to generally any process controller. For example, EXPERION process controllers (e.g. C300), the ControlEdge PLC, and the I/O gateway devices such as ControlEdge RTU2020, all from Honeywell International Inc. Disclosed embodiments may also be applicable to the evolution of Honeywell's Enhanced High Performance Process Manager (EHPM) once it adopts I/O mesh architecture. The EHPM is a process-connected device on the Enhanced Universal Control Network (EUCN) that provides regulatory control and sequence operations.

Figure 3:
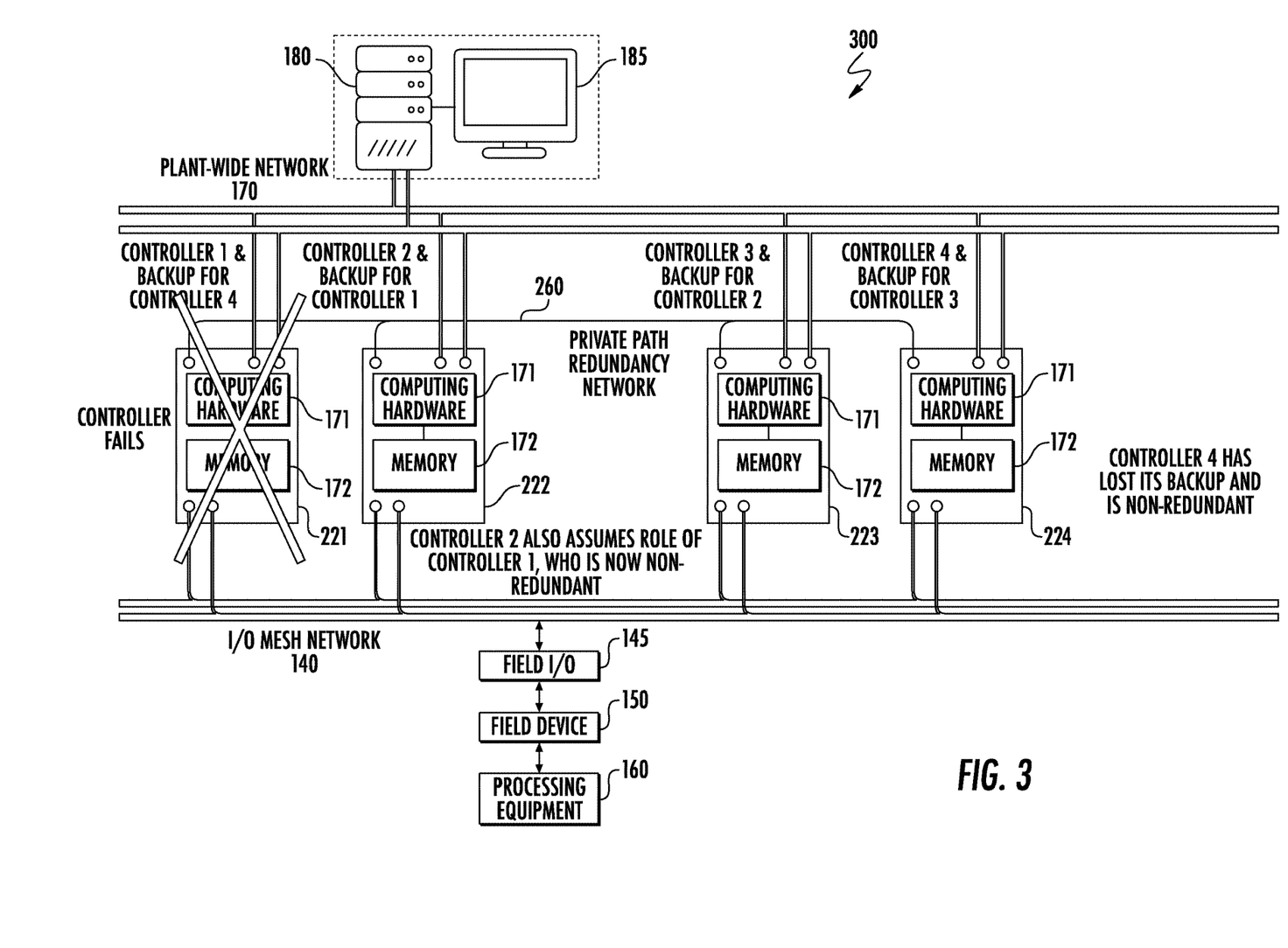
FIG. 3 references the prior state in FIG. 2, where one controller has failed. Highlighted text describes how the control operations change, which indicate a loss of controller redundancy, but no loss of process control.
Figure 4:
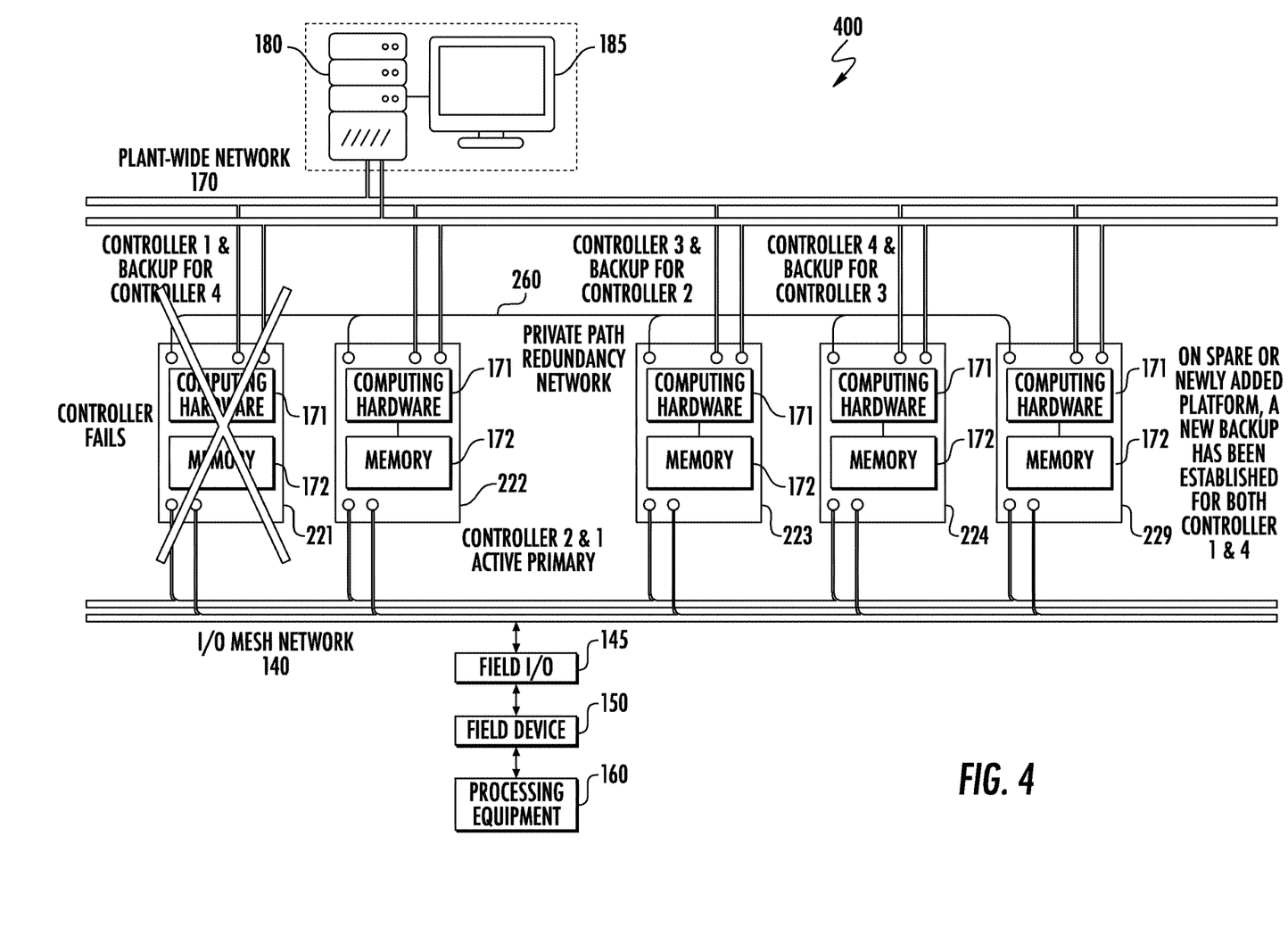
FIG. 4 references the prior state in FIG. 3, and assuming the depicted availability existing or newly added spare hardware on the pool represented by the 5th controller on the right, where backups for (currently non-redundant) controllers 1 and 4 can be automatically established on the spare hardware.
Figure 5:
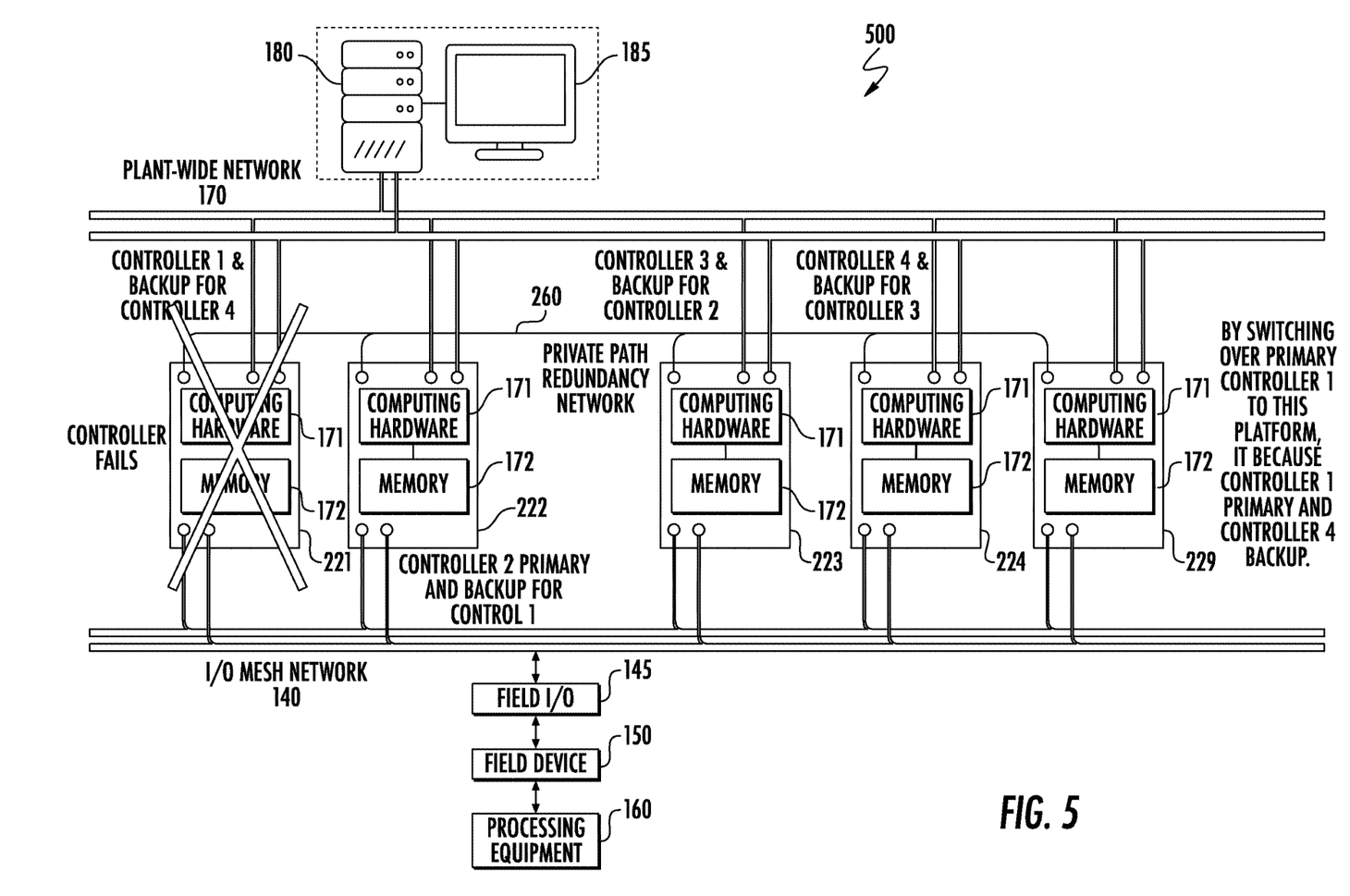
FIG. 5 shows by switching over the primary role for controller 1 to the new hardware, full and normal redundancy operation has been restored, with 4 controllers, all controllers running one primary process control mission, and all backed up by another platform. Assuming the pre-installed availability of a spare platform on the pool, and assuming the failure of one controller, this scenario demonstrates how full redundancy for M primary controllers can be restored with a total of N platforms, where N=M+1 and with no hardware deployment.

FIGS. 3, 4 and 5 show an example controller failure scenario which demonstrates the self-healing potential of the disclosed M:N redundancy scheme. These figures are logical modifications to FIG. 2, where the controllers are again shown as 221, 222, 223 and 224, depicting a controller failure scenario and recovery. FIG. 3 references the prior state in FIG. 2, where one process controller shown as controller 221 has failed. The text indicates how control operations change, which indicate loss of redundancy, but no loss of control. FIG. 4 references the prior state in FIG. 3, and assuming the depicted controller availability existing or newly added spare controller hardware on the group of controller connected by the private path redundancy network 260 represented by the 5th controller shown as controller 229 on the right, backups for (currently non-redundant) controllers 1 221 and controller 4 224 can be automatically established on the spare controller hardware. FIG. 5 shows by switching over the primary role for Controller 1 221 upon failure to the new hardware shown as controller 229, full and normal redundancy operation has been restored, with 4 controller platforms, each running one primary control mission, and all backed up by another controller platform. Assuming the pre-installed availability of a spare platform on the group of controllers connected by private path redundancy network 260, and assuming the failure of one controller, this scenario demonstrates how full redundancy for M primary controllers can be restored with a total of N controller platforms, where N=M+1 and with no hardware deployment.

FIG. 6 depicts an example disclosed network control system 600 implementing disclosed redundant I/O gateway and redundant controllers shown as 4 computing platforms 621, 622, 623 and 624 that collectively implement a redundant I/O gateway device and three redundant controllers 1, 2 and 3. Each computing platform includes computing hardware 171 and memory 172 for simultaneously supporting at least one process controller and another process controller or an I/O gateway, where the computing platforms are again coupled to one another by a private path redundancy network 260 to provide a hardware resource pool. As known in the art an I/O gateway is a type of data acquisition device that provides communication between entities on two distinct networks, typically an I/O network and a plant network, providing a communication path for controllers on the Plant-wide network 170 to communicate with I/O devices on the I/O network.

An I/O gateway can potentially perform other functions, including control capability similar to that provided by a controller, thereby performing both the role of the I/O network gateway and the controller. All redundant entities are represented as two entities which exist on different physical computing platforms: a primary and a backup. Computing platform 621 hosts a primary I/O gateway and backup controller 3. Computing platform 622 hosts a primary controller 1 and a backup I/O gateway. Computing platform 623 comprises a primary controller 2 and backup controller 1. Computing platform 624 comprises primary controller 3 and backup controller 2. Although computing platforms 623 and 624 are not shown directly coupled to I/O mesh network 240, they can be coupled through computing platforms 621 and 622 to the field I/O 145, field devices 150 and processing equipment 160, or through a separate I/O mesh network (not shown).

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, extension to other r automation settings including buildings controllers. In addition, while a particular feature may have been disclosed with respect to only one of several implementations, such feature may be combined with one or more other features of the other implementations as may be desired and advantageous for any given or particular application.

The invention claimed is:

1. A method of fault-tolerant process control, comprising:
providing a network process control system in an industrial processing facility (IPF) comprising a plant-wide network coupling at least one server to a plurality of computing platforms each including computing hardware and memory hosting at least one software application for simultaneously supporting a process controller and another process controller or an input/output (I/O) gateway, the computing platforms coupled together by a private path redundancy network for providing a hardware resource pool;
wherein at least some of the plurality of computing platforms are directly coupled by an input/output (I/O) mesh network to plurality of I/O devices to field devices that are coupled to processing equipment;
detecting at least one failing device in the hardware resource pool, and
utilizing the private path redundancy network, placing into service as a backup for the failing device the another process controller or the I/O gateway that is at a different one of the plurality of computing platforms.

2. The method of claim 1, wherein the placing into service is performed automatically.

3. A method of claim 1, where the another process controller or the another I/O gateway provides another mission as a process controller or as an I/O gateway both immediately before and after the placing into service.

4. The method of claim 1, wherein the plurality of computing platforms support exclusively the process controllers.

5. The method of claim 1, wherein the plurality of computing platforms collectively support both the process controllers and the I/O gateways.

6. The method of claim 1, where a speed of the private path redundancy network is greater than a speed of the plant-wide network.

7. The method of claim 1, further comprising performing an initial synchronization after the placing in service, and then a slower synchronization compared to the initial synchronization to transfer a complete database in an atomic fashion while running as the backup.

8. A computer platform arrangement for a network process control system in an industrial processing facility (IPF), comprising:
a plurality of computing platforms each comprising computing hardware and memory hosting at least one software application for simultaneously supporting a process controller and another process controller or an input/output (I/O) gateway;
a private path redundancy network coupling together a plurality of computing platforms to provide a hardware resource pool;
wherein upon detecting at least one a failing device in the hardware resource pool of a first of the plurality of process controllers or a first of the I/O gateway, over the private path redundancy network placing into service as a backup for the failing device the another process controller or the I/O gateway that is at different one of the plurality of computing platforms.

9. The computer platform arrangement of claim 8, wherein the placing into service is performed automatically.

10. The computer platform arrangement of claim 8, wherein the plurality of computing platforms are exclusive of any dedicated secondary hardware.

11. The computer platform arrangement of claim 8, wherein each of the plurality of computing platforms provides a backup for a different one of the plurality of computing platforms.

12. The computer platform arrangement of claim 8, wherein the plurality of computing platforms collectively support both the process controllers and the I/O gateways.

13. The computer platform arrangement of claim 8, wherein the plurality of computing platforms support exclusively the process controllers.

14. A fault-tolerant network process control system in an industrial processing facility (IPF), comprising:
 a plant-wide network coupling at least one server to a computer platform arrangement comprising a plurality of computing platforms each including computing hardware and memory hosting at least one software application for simultaneously supporting a process controller and another process controller or an input/output (I/O) gateway, the computing platforms coupled together by a private path redundancy network for providing a hardware resource pool;
 wherein at least some of the plurality of computing platforms are directly coupled by an input/output (I/O) mesh network to plurality of I/O devices to field devices that are coupled to processing equipment,
 wherein the computer platform arrangement is configured for:
  detecting at least one failing device in the hardware resource pool, and
  utilizing the private path redundancy network to place into service as a backup for the failing device the another process controller or the I/O gateway that is at a different one of the plurality of computing platforms.

15. The control system of claim 14, wherein the placing into service is performed automatically.

16. The control system of claim 14, wherein the plurality of computing platforms are exclusive of any dedicated secondary hardware.

17. The control system of claim 14, wherein each of the plurality of computing platforms provides a backup for another of the plurality of computing platforms.

18. The control system of claim 14, wherein the plurality of computing platforms collectively support both the process controllers and the I/O gateways.

* * * * *